No. 682,481. Patented Sept. 10, 1901.
H. E. MILLER.
MACHINE FOR MOLDING POPCORN.
(Application filed Aug. 30, 1900.)
(No Model.) 2 Sheets—Sheet 1.
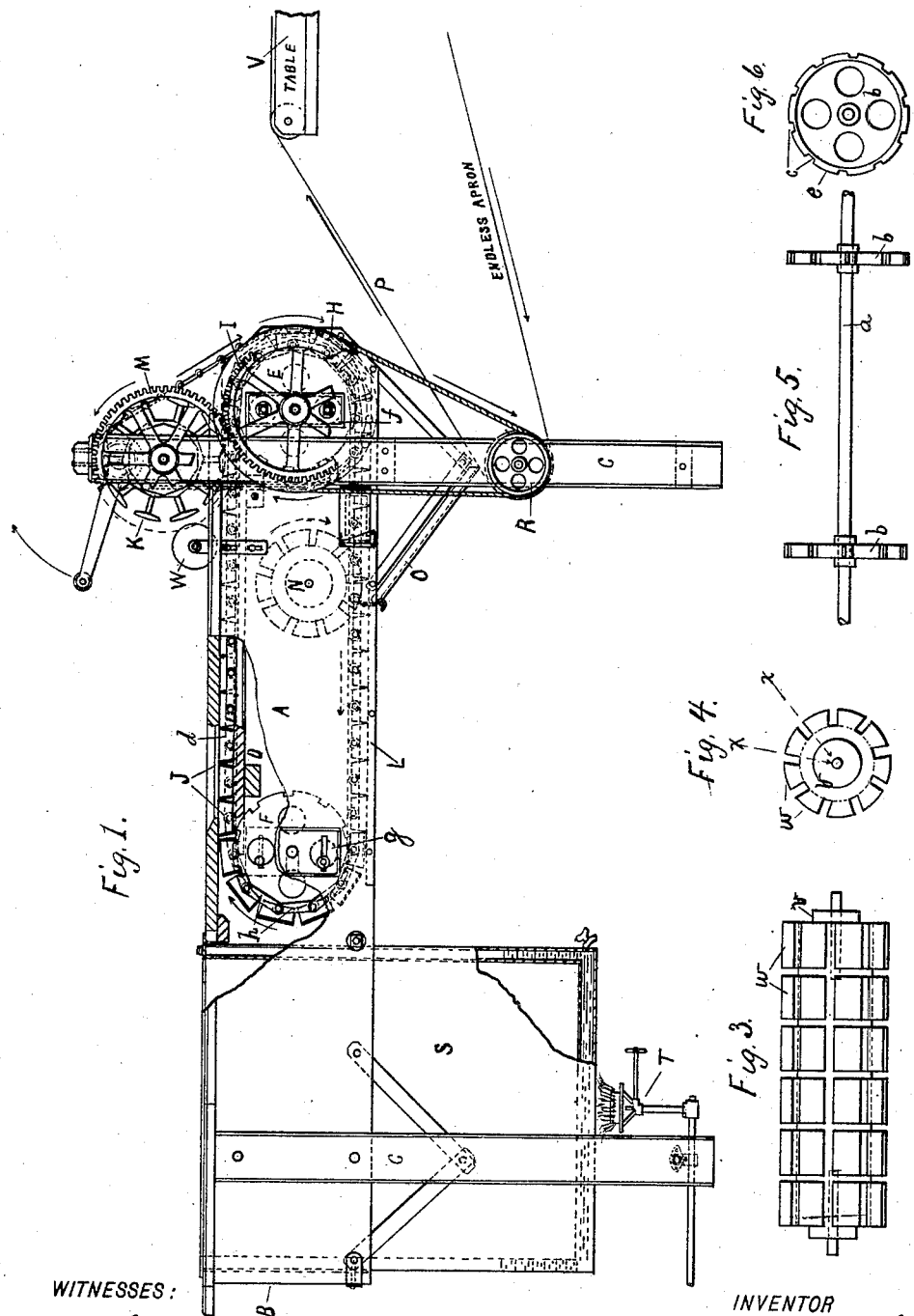
WITNESSES:
F. J. Lockhart
M. B. Francisco
INVENTOR
Henry Ellis Miller
BY
John W. Lockhart
ATTORNEY

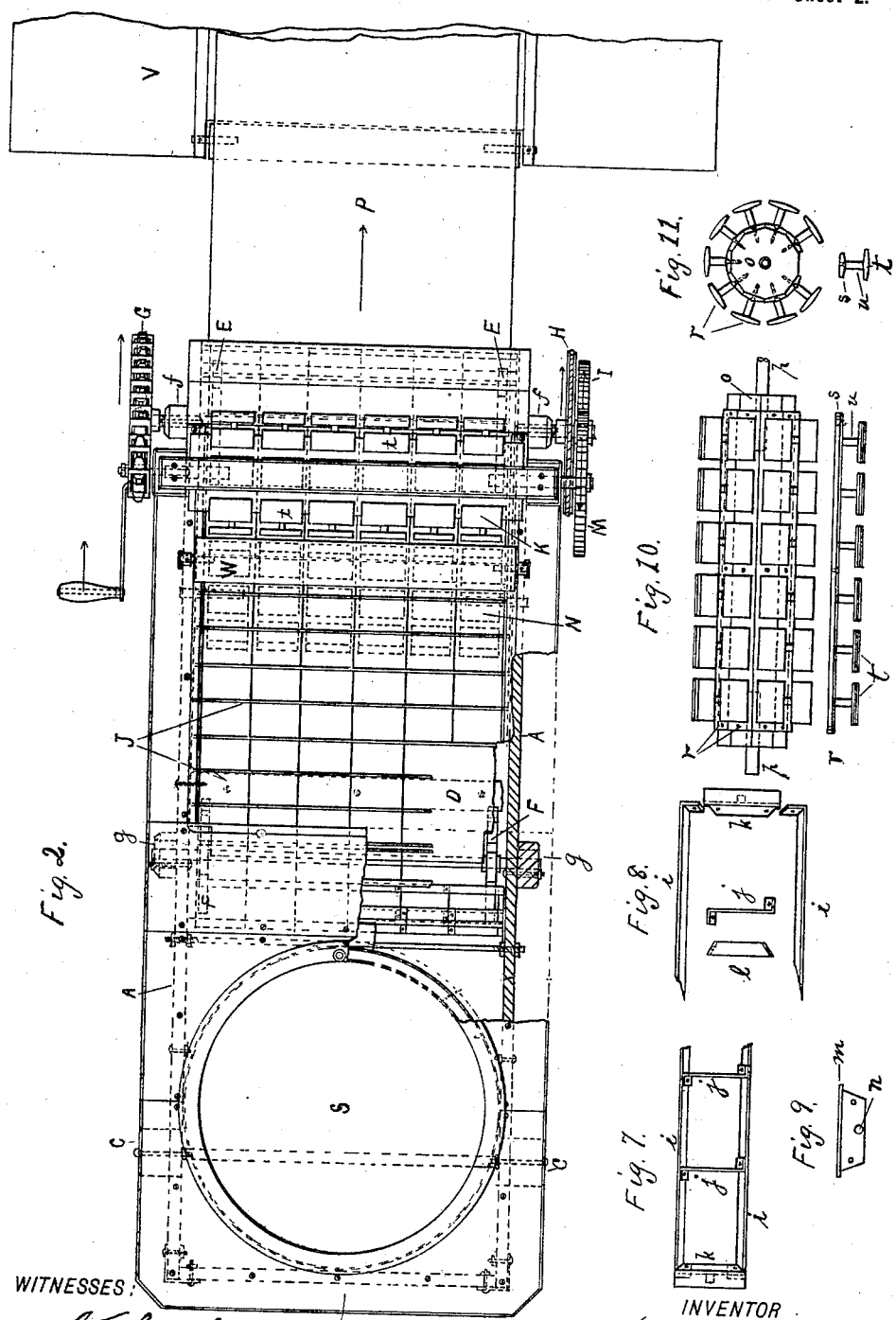

UNITED STATES PATENT OFFICE.

HENRY ELLIS MILLER, OF KANSAS CITY, MISSOURI, ASSIGNOR OF ONE-HALF TO JOHN W. LOCKHART, OF SAME PLACE.

MACHINE FOR MOLDING POPCORN.

SPECIFICATION forming part of Letters Patent No. 682,481, dated September 10, 1901.

Application filed August 30, 1900. Serial No. 28,552. (No model.)

*To all whom it may concern:*

Be it known that I, HENRY ELLIS MILLER, residing at Kansas City, in the county of Jackson and State of Missouri, have invented certain new and useful Improvements in Machines for Molding Popcorn, of which the following is a specification.

My invention relates to improvements in popcorn-molding machines in which the various operations of forming the cakes are performed automatically; and the objects of my improvements are to perform continuously and automatically the operations of placing the molds in position for filling, of removing the same to the press, of pressing, of placing in position for ejecting, and of ejecting the molded articles onto a conveyer, delivering the same to "wrappers" and "packers," and returning the molds to their first position for refilling.

My invention relates more especially to the following elements:

First. An endless series of flexibly-connected molds formed by fastening a number of individual molds together at the ends by means of links, the series of molds being made to travel over rotary carriers. The individual molds are removable and interchangeable.

Second. A combined rotary mold carrier and driver, by which the molds are caused to make the complete cycle from the position for filling through the compressing of the cake and the ejecting of the same to their first position, that of filling. The mold-carriers are adjustable for keeping the proper tension on the molds.

Third. A compressor or mechanism for pressing the flake-corn into the molds, giving the cake the proper size, shape, and density.

Fourth. An ejector working from the bottom of the molds, forcing the formed cakes out at the top of the molds onto a conveyer.

Fifth. A conveyer for automatically carrying the cakes from the ejector to the wrapping-table.

Sixth. A mixing-tank consisting of a water-jacketed tank having a means for heating the water to keep the flake-corn and syrup warm until mixed and ready for forming into cakes.

My invention also relates to certain features of construction and certain mechanisms for connecting the above-recited elements into a working whole.

I attain the objects enumerated above by the mechanism illustrated in the accompanying drawings, in which—

Figure 1 represents a side elevation of my machine, partly in section, and a portion of the packing-table and conveyer. Fig. 2 represents the top view of Fig. 1. Fig. 3 is a side view of the ejector. Fig. 4 is an end view of Fig. 3. Fig. 5 is a side view of the mold carrier and driver. Fig. 6 is an end view of Fig. 5. Fig. 7 represents a part of the mold. Fig. 8 is a section of the mold having the pieces separated, showing the construction. Fig. 9 is a side view of an end piece forming the molds, as in Fig. 7. Fig. 10 is the compressor with one bar separated, showing the construction. Fig. 11 is end view of Fig. 10.

Similar letters refer to similar parts throughout the several views.

The side pieces A, end pieces B, legs C, and table or deck D constitute the principal framework of the machine.

*The mold carriers and drivers.*—The side pieces A support between them at one end and near the middle the mold carriers and drivers E and F, which guide, support, and drive the series of molds and which consist each of a shaft $a$, having the disk $b$ rigidly fastened to it, each disk having the notches $c$ in its periphery so distanced that the lower edge of the mold $d$ will fall into two adjacent notches, and catching there the mold will be carried forward and around as the shaft $a$ is turned. The adjacent lower edge of two contiguous molds will fall in the same notch and the body portion $e$ of the disk will partly enter the mold. The shaft $a$ of the mold-carrier E extends through the side pieces A and into the bearings $f$, fastened to the side pieces A. The shaft $a$ on the left-hand side of the machine supports a sprocket-wheel G, while on the opposite end it supports a pulley H and a spur-gear I. The mold-carrier E drives the endless series of molds J as well as supports it at that end, while the carrier F merely supports the endless series of molds and is adjustable for keeping it taut. The mold-carrier F being of the same construction as the mold-carrier E can be readily made to drive the series of molds as well as to carry or support it. The shaft $a$ of the carrier F passes through slotted holes in the side pieces A and extends beyond them into bearing-blocks $g$, which are adjustable longitudinally with the side pieces A. By moving the carrier F backward or forward the series of molds will be tightened or loosened.

*The molds.*—The endless series of molds J consists of a number of individual molds $d$, fastened together at the ends by the links $h$, and when all the molds are so connected they form a flexible endless series which passes over the table or decking D, under the compressor K, around the carriers E and F, and slides on the guide-rails L, passing below the rotary ejector N, which partly enters them, forcing the compressed cakes out onto a conveyer as the molds travel. The individual molds (see Figs. 7 and 8) consist of the side pieces $i$, the cross-pieces $j$, and the end pieces $k$. The side pieces $i$ are bent at right angles toward the same side at the ends, so as to lap over the end pieces $k$ and are attached thereto. The cross-pieces $j$ are bent at the ends at right angles in opposite directions and at an angle to the long axis of the middle member, as seen in $l$, Fig. 8, which represents a side view of the cross-piece $j$. The cross-pieces $j$ are fastened to the side pieces $i$ by the short bent members. The end piece $k$ has its ends diverging upwardly corresponding to the taper of the ends of the cross-pieces $j$. At the top edge of the end piece $k$ is a flange $m$, projecting laterally. Near the lower edge on the short axis or midway between the ends of the end pieces $k$ a stud $n$ projects from the same side as the flange $m$ and has a hole transversly through it to receive a spring cotter or key. The links $h$ are placed on the studs $n$ on each two adjacent molds, connecting them together and forming a flexible series of molds. The position of the stud $n$ is material, as by placing it near the lower edge of the end piece $k$ the divergence of the side pieces $i$ may be decreased to a minimum and the molds will pass around small curves without binding, which is important, as in passing over the mold-carriers E F. The divergence of the side pieces $i$ upwardly, making the mold narrower at the bottom than at the top, aids in the delivery of the compressed cake from the mold, as well as permits the series of molds to travel around a comparatively small mold-carrier at the ends and yet have the upper edge of the adjacent molds in contact when traveling across the table D, which is necessary to prevent material from being pressed down between them, thereby clogging the machine. The features of construction found in the position of the stud $n$—namely, near the lower edge instead of in the middle and in the diverging sides—therefore are important.

*The compressor.*—The compressor K consists of a multifaced roller $o$, supported and driven by the spindles $p$ and having the elements $r$ attached to its faces. Each element $r$ consists of a bar $s$, having integral projections comprising a broad face $t$ upon a stem $u$ and connected thereby to the bar $s$ and is secured to a face of the multifaced roller $o$ by the bar $s$. The face $t$ fits within a compartment of the mold $d$ and compresses the cake. The compressor is caused to revolve uniformly with the forward movements of the molds by the spur-gear M upon one end of the spindle, which gear meshes with the gear I on the shaft of the mold carrier and driver E.

*The ejector.*—The ejector N is situated between the side pieces A and is supported by them. It is also inside of the endless series of molds J and between the mold-carriers E and F. It consists of a body portion $v$, having projections $w$, uniformly arranged on its periphery, the projections $w$ having the corresponding side face or driving-face of each longitudinal row directed to the axis of the roller, as $x\ x$, Fig. 4, and the other side face parallel to the driving-face of the longitudinal row adjacent to it. The faces $x\ x$ form the driving-faces of the roller. A projection $w$ of the roller being partly within the mold $d$ in its natural position, when the mold travels the side of the mold bears against the face $x$ and causes the roller to turn and successive molds passing cause the ejector to revolve.

*The conveyer.*—O is a chute for delivering cakes as they are forced out of the molds by the ejector N onto the endless apron or conveyer P, which is driven by the pulley R, connected with the large pulley H, attached to the shaft $a$ of the mold-carrier E. The endless apron P conveys the cakes upon the table V, at which operatives pack or wrap the cakes as they are delivered to them.

S represents a water-jacketed can for mixing the flake-corn and syrup or other materials for the molds and for keeping the material hot until used.

T is a heating device for the tank or can S.

W is an adjustable roller for leveling the flake-corn and partly pressing it into the molds before it passes under the compressor K.

I am aware that a series of flexibly-connected molds has been used; also, that a rotary compressor, a rotary ejector, and a rotary mold carrier and driver have all been used. Hence I claim none of these features broadly; but What I do claim as my invention, and desire to secure by Letters Patent, is—

1. A machine of the character described, having a mixing-tank at one end, a table-top at the other end, a series of endless, flexibly-connected molds traveling across the table-top, rotary disks having notched peripheries mounted on shafts and adapted to engage and rotate said molds, a rotary compressor situated above the table-top at the end opposite the said mixing-tank, a spur-gear connecting said compressor with the front mold-carrier, an ejector situated in the body of the machine below the table and between the mold-drivers, an endless apron to receive the ejected articles, delivering them onto a table, and a driving device for the said apron.

2. A machine of the character described, consisting of a suitable framing, a table-top, a series of endless, flexibly-connected molds traveling across the table-top, a combined mold carrying and driving device, a rotary compressor above the table-top having projections adapted to enter the molds, and an ejector situated beneath the table-top and between the mold-carriers, working into the bottom of the molds and ejecting the article downwardly.

3. A machine of the character described, consisting of a suitable framing, a table-top, a series of endless, flexibly-connected molds traveling across the table-top, a combined mold carrying and driving device, a rotary compressor above the table-top and near one end, having projections adapted to enter the molds, said compressor connected to the front mold-carrier and driven thereby.

4. The combination, with, a series of flexibly-connected molds, mold carriers and drivers, and a rotary compressor, of the shaft of the mold-carrier E, forming the driving-shaft of the mechanism, having a driving-gear on one end, the spur-gear I on the other end, meshing into the spur-gear M, fixed on the end of the compressor-spindle, the said mold-carrier shaft also bearing the pulley H upon one end, which pulley is connected with small pulley R and drives the endless apron P.

5. A machine of the character described, consisting of a suitable framing, a table-top, a series of endless, flexibly-connected molds traveling across the table-top, a combined mold carrying and driving device, a compressor above the table-top, having projections adapted to enter the molds, and a rotary ejector situated beneath the table-top and between the mold-carriers, working into the bottom of the molds and caused to rotate by the moving molds.

6. An ejecting-roller, having a body portion $v$, with projections $w$, uniformly arranged on its periphery, each longitudinal row of projections having the plane of its driving-face directed to the axis of the roller.

7. An ejecting-roller, having a body portion $v$, with projections $w$, uniformly arranged on its periphery, each longitudinal row of projections having the plane of its driving-face directed to the axis of the roller, and the plane of the other side face parallel to the plane of the driving-face of the longitudinal row of projections adjacent to the said side face.

8. A one-piece ejecting-roller, having a body portion $v$, with integral projections $w$, uniformly arranged on its periphery, each longitudinal row of projections, having the plane of its driving-face directed to the axis of the roller, and the plane of the other side face parallel to the plane of the driving-face of the longitudinal row of projections, adjacent to the said side face.

9. A mold, consisting of side pieces $i$, cross-pieces $j$, and end pieces $k$, the end pieces, each, having a stud $n$ on its short axis and near its lower edge, and a flange $m$ at its top, said elements so joined as to make the side pieces diverge upwardly.

10. A mold, having side pieces $i$, bent at right angles and toward the same sides at the ends, lapping over a portion of the end pieces and secured thereto, cross-pieces $j$, bent at the ends at right angles in opposite directions and at an angle to the long axis of the middle member, the short members being parallel to the side pieces $i$, and secured thereto, and end pieces $k$, having a stud $n$ on the short axis and near the lower edge, a flange $m$ at the top, and the ends diverging upwardly to correspond to the taper of said cross-pieces.

HENRY ELLIS MILLER.

Witnesses:
HENRY BRAY,
THOMAS E. McINTYRE.